United States Patent
Yalamanchi et al.

(10) Patent No.: US 8,639,581 B1
(45) Date of Patent: Jan. 28, 2014

(54) PRICING FOR FOREIGN MARKETPLACES

(75) Inventors: Aravind Yalamanchi, Lynnwood, WA (US); Stefan M. Haney, Seattle, WA (US); Jason W. Vogrinec, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 425 days.

(21) Appl. No.: 13/027,933

(22) Filed: Feb. 15, 2011

(51) Int. Cl.
*G06Q 30/00* (2012.01)

(52) U.S. Cl.
USPC ........................................ 705/26.1; 705/26.41

(58) Field of Classification Search
USPC ................................................ 705/26.1–27.2
See application file for complete search history.

(56) References Cited

U.S. PATENT DOCUMENTS

| | | | |
|---|---|---|---|
| 2003/0061170 A1* | 3/2003 | Uzo | 705/64 |
| 2004/0167854 A1* | 8/2004 | Knowles et al. | 705/41 |
| 2007/0038523 A1* | 2/2007 | Komem et al. | 705/26 |

OTHER PUBLICATIONS

Webb, D. (2000). Reversing the cash drain: More online dollars are staying in canada, but if canadian dot-coms don't take advantage of a $50b industry, american dot-coms will. E Business Journal, 2(2), 14-14,18.*

* cited by examiner

*Primary Examiner* — Resha Desai
(74) *Attorney, Agent, or Firm* — Thomas | Horstemeyer, LLP (57) ABSTRACT

Disclosed are various embodiments for adjusting prices of items in foreign marketplaces based on fluctuations in currency exchange rates. A deviation from a return sought by a merchant for an item offered in an electronic marketplace is determined. The deviation results from a change in an exchange rate between a first currency employed by the merchant and a second currency employed by the electronic marketplace. It is determined whether the deviation from the return meets a threshold. One or more actions in response to the deviation are implemented when the deviation from the return meets the threshold.

24 Claims, 5 Drawing Sheets

PRICING FOR FOREIGN MARKETPLACES

BACKGROUND

An electronic marketplace may correspond to a network site where a multitude of different sellers offer products for sale. Electronic marketplaces are often associated with a particular country, and the products are typically priced using the currency associated with the country. However, many different currencies exist. Consequently, foreign sellers may have to manually convert a first price in their preferred currency to a second price in the currency used in the electronic marketplace.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to adjusting prices of items in foreign marketplaces to account for fluctuations in currency exchange rates. A merchant may have a specific return in mind when listing an item for sale in a foreign electronic marketplace. As a non-limiting example, a merchant based in the United States may want to obtain five dollars for a certain widget after any transaction costs or commissions imposed by the electronic marketplace. However, if the merchant wishes to sell in a foreign marketplace, the widget may need to be priced in a different currency. Currency exchange rates are often subject to substantial fluctuations, and if a fixed price for the widget is established, the return to the merchant may fluctuate.

Various embodiments of the present disclosure monitor fluctuations in currency exchange rates in order to correct deviations of pricing in foreign marketplaces from the return desired by a merchant. In one embodiment, the merchant may be notified if the current exchange rate is adversely impacting the desired return. In another embodiment, an item may be automatically re-priced in the foreign marketplace to account for an exchange rate fluctuation. Parameters that control notification and re-pricing may be configured by the merchant. In the following discussion, a general description of the system and its components is provided, followed by a discussion of the operation of the same.

Figure 1:
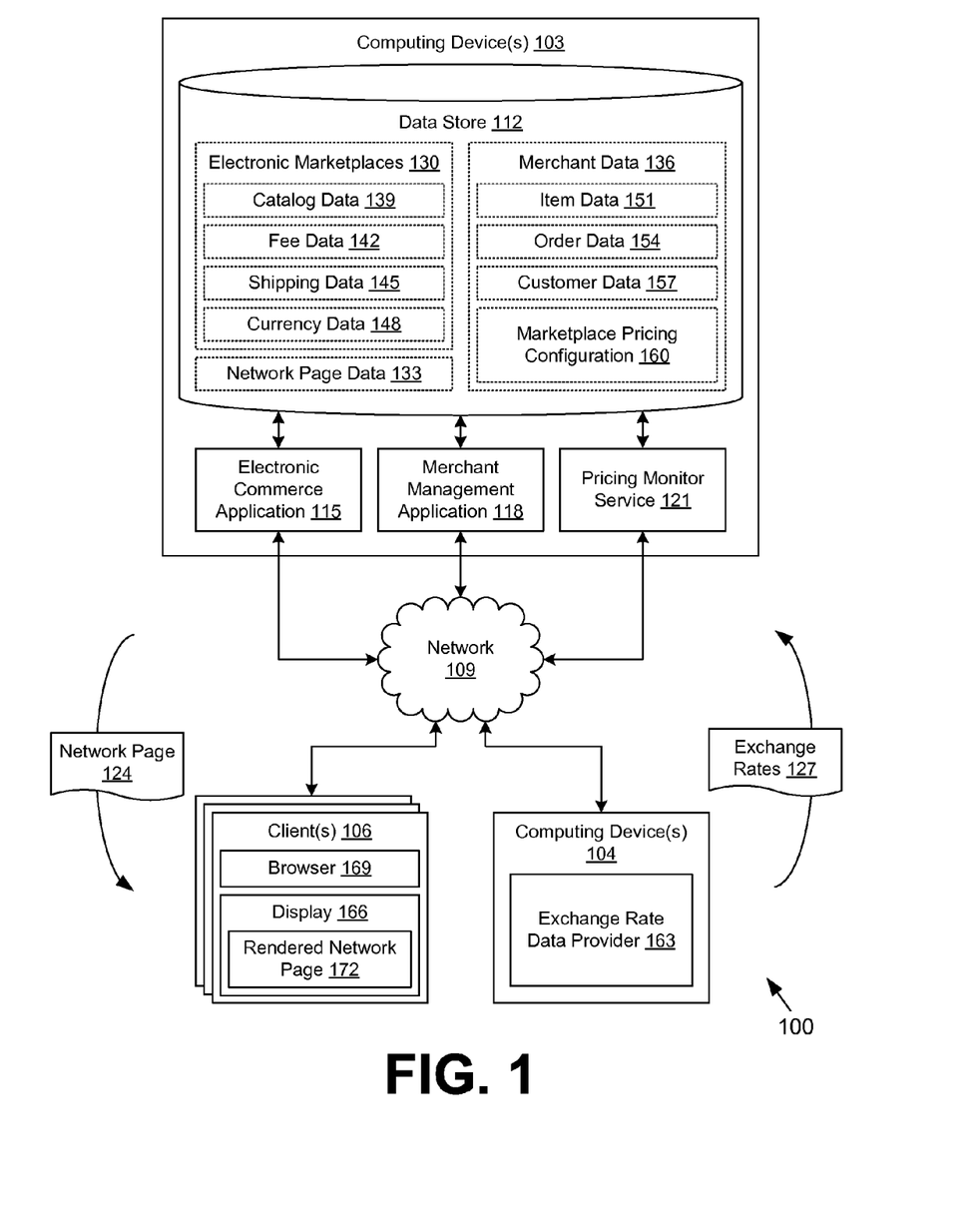
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 104 and one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include an electronic commerce application 115, a merchant management application 118, a pricing monitor service 121, and other applications, services, processes, systems, engines, or functionality not discussed in detail herein. The electronic commerce application 115 is executed in order to facilitate the online purchase of items from one or more electronic marketplaces over the network 109. The electronic commerce application 115 also performs various backend functions associated with the online presence of an electronic marketplace in order to facilitate the online purchase of items as will be described. For example, the electronic commerce application 115 generates network pages 124 such as, for example, web pages and/or other types of network content that are provided to clients 106 for the purposes of promoting and selecting items for purchase, rental, download, lease, or any other forms of consumption.

The merchant management application 118 is executed in order to provide a management interface for merchants to manage their online presence within one or more electronic marketplaces. For example, the merchant management application 118 may generate one or more network pages 124 that are configured to provide an administrative interface. Such network pages 124 may allow merchants to list items for sale in one or more electronic marketplaces, update inventory, set prices for items, set shipping and handling charges, review and fulfill orders, and so on.

The pricing monitor service 121 is executed to obtain exchange rates 127 for currencies and to determine a deviation from a return sought by a merchant for an item offered in a foreign electronic marketplace according to a change in the exchange rate 127 between a currency employed by the merchant and a currency employed by the foreign electronic marketplace. Depending on whether the deviation is significant (e.g., whether the deviation meets or exceeds a threshold), the pricing monitor service 121 may be configured to implement one or more actions to correct the deviation. For example, the pricing monitor service 121 may notify the merchant, temporarily remove the offering of the item from the foreign electronic marketplace, automatically re-price the item according to parameters set by the merchant, and/or implement another action. Further, the pricing monitor service 121 may be configured to determine whether the item is irregularly priced in the foreign electronic marketplace (i.e., priced too high or too low relative to other offerings) and implement one or more actions in response to the irregular pricing.

The data stored in the data store 112 includes, for example, data relating to one or more electronic marketplaces 130, network page data 133, merchant data 136, and potentially other data. Each electronic marketplace 130 may correspond to a distinct network site targeting a geographic region that offers items for sale by a plurality of merchants. For example, separate electronic marketplaces 130 may be established that target various states, countries, continents, etc. An electronic marketplace 130 is said to be a foreign marketplace relative to a merchant if it targets a different geographic region from the geographic region in which the merchant is based. Each electronic marketplace 130 may be associated with various data such as, for example, catalog data 139, fee data 142, shipping data 145, currency data 148, and/or other data.

The catalog data 139 may include information related to a plurality of items offered in the electronic marketplace. An item may refer to a product, good, service, software download, multimedia download, social networking profile, or any combination, bundle, or package thereof, that may be offered for sale, purchase, rental, lease, download, and/or any other form of consumption as may be appreciated. The various data stored in catalog data 139 may include, for example, titles, descriptions, quantities, conditions, images, options, weights, customer reviews, customer ratings, keywords, shipping restrictions, prices, tax classifications, unique identifiers, and any other data related to items.

Fee data 142 may describe a fee structure associated with the respective electronic marketplace 130. For example, an electronic marketplace 130 may charge the merchant a commission for a sale of an item. Such a commission may be a percentage of the price and/or a fixed fee. Such transaction costs may be automatically built into the pricing model for the items offered through the electronic commerce application 115. It is noted that the transaction costs may vary among the electronic marketplaces 130.

The shipping data 145 may describe the shipping methods that are available for the respective electronic marketplace 130. Different shipping carriers may offer service in the different countries or regions that are targeted by the electronic marketplaces 130. The currency data 148 describes the currency that is employed by the respective electronic marketplace 130. As non-limiting examples, an electronic marketplace 130 that targets the United States may employ U.S. dollars, an electronic marketplace 130 that targets the United Kingdom may employ British pounds, and an electronic marketplace 130 that targets France may employ euros.

The network page data 133 includes data that may be used in the generation of the network pages 124. Such data may include templates, code, images, audio, video, hypertext markup language (HTML), extensible markup language (XML), JavaScript, cascading style sheets (CSS), and/or other data.

The merchant data 136 includes various data relating to the plurality of merchants with offerings in the electronic marketplaces 130. The merchant data 136 may include item data 151, order data 154, customer data 157, a marketplace pricing configuration 160, and/or other data. The item data 151 describes the various items that are offered by the respective merchant in the electronic marketplaces 130. In one embodiment, the item data 151 may correspond to the virtual inventory of the merchant. Such item data 151 may be provided directly through the catalog data 139 to the respective electronic marketplace 130 or may be customized for a particular electronic marketplace 130.

The order data 154 includes data related to orders placed by customers for items. As a non-limiting example, the order data 154 may include identifications of items purchased, quantities, prices, shipping methods selected, taxes, comments, gift wrapping instructions, and/or other information related to orders. The customer data 157 includes data related to customers of the merchant. Such data may include name, shipping addresses, billing addresses, contact information, payment instruments, and so on. Such customer data 157 may be maintained separately for each merchant or together for all merchants.

The marketplace pricing configuration 160 includes various parameters defined by the merchant to govern the pricing of items offered by the merchant in one or more of the electronic marketplaces 130. For example, a merchant may establish a desired return for an item in the local currency of the merchant. A merchant may also establish minimum returns in local currency or foreign currency, maximum returns in local currency or foreign currency, minimum prices in foreign currency, maximum prices in foreign currency, and/or other item pricing parameters. Additionally, the merchant may also configure whether notifications are to be sent, whether automatic re-pricing is enabled, and/or other parameters governing the behavior of the pricing monitor service 121.

The computing device 104 may comprise, for example, a server computer or any other system providing computing capability. Alternatively, a plurality of computing devices 104 may be employed that are arranged, for example, in one or more server banks or computer banks or other arrangements. For example, a plurality of computing devices 104 together may comprise a cloud computing resource, a grid computing resource, and/or any other distributed computing arrangement. Such computing devices 104 may be located in a single installation or may be distributed among many different geographical locations. For purposes of convenience, the computing device 104 is referred to herein in the singular. Even though the computing device 104 is referred to in the singular, it is understood that a plurality of computing devices 104 may be employed in the various arrangements as described above.

Various applications and/or other functionality may be executed in the computing device 104 according to various embodiments. The components executed on the computing device 104, for example, include an exchange rate data provider 163, and other applications, services, processes, systems, engines, or functionality not discussed in detail herein. The exchange rate data provider 163 is executed to provide data relating to exchange rates 127 to requestors over the network 109. For example, the exchange rates 127 served up by the exchange rate data provider 163 may indicate the rate of exchange between a first currency and a second currency and vice versa. The exchange rates 127 may be updated in real-time, or hourly, daily, weekly, or according to some other time period. The exchange rate data provider 163 may be configured to push updates to the exchange rates 127 or to respond to polling for the exchange rates 127. In one embodiment, the computing device 104 is operated by a different entity from the computing device 103.

The client 106 is representative of a plurality of client devices that may be coupled to the network 109. The client 106 may correspond to a merchant or a customer. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 166. The display 166 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 169 and/or other applications. The browser 169 may be executed in a client 106, for example, to access and render network pages 124, such as web pages, or other network content served up by the computing device 103 and/or other servers, thereby generating a rendered network page 172 on the display 166. The client 106 may be configured to execute applications beyond browser 169 such as, for example, email applications, instant message applications, and/or other applications.

Next, a general description of the operation of the various components of the networked environment 100 is provided. To begin, a merchant adds items to the catalog of an electronic marketplace 130 that is considered foreign to the merchant. To this end, the merchant management application 118 may generate a series of user interfaces to add the items to the electronic marketplace 130. The merchant management application 118 may provide numerous interfaces for the management of the online presence of the merchant in one or more of the electronic marketplaces. Such user interfaces may be embodied in network pages 124 that are sent over the network 109 for rendering in a client 106 operated by a merchant user. The discussion that follows is focused on the pricing aspect of managing the online presence of the merchant.

The merchant configures pricing for the item, or for multiple items in some embodiments. The merchant provides a desired return that is specified in the local currency of the merchant. However, the electronic marketplace 130 may use a foreign currency that differs from the local currency. The merchant management application 118 obtains the exchange rate 127 from the exchange rate data provider 163 and converts the desired return of the merchant to the foreign currency.

The merchant management application 118 may add in a transaction cost to cover a commission and/or other charges established by the proprietor of the electronic marketplace. Thereafter, a price for the item is established in the foreign currency. When customers browse or search the network site of the electronic marketplace 130 through network pages 124 generated by the electronic commerce application 115, the established price in the foreign currency is quoted.

Nonetheless, exchange rates 127 are rarely static, and substantial fluctuations may occur. The pricing monitor service 121 may be configured to monitor exchange rates 127 and prices of items to ensure that pricing parameters established by merchants are respected. The pricing monitor service 121 may be configured to automatically adjust prices of items, send notifications of changes in returns to merchants, temporarily disable listings of items, and/or implement other actions to correct such pricing problems. The pricing monitor service 121 may be configured to notify merchants through an online "sales coach" within network pages 124 served up by the merchant management application 118 or by email, text message, telephone call, and/or other forms of communication.

It is noted that the exchange rates 127 may be acquired from the exchange rate data provider 163 at any periodic frequency. In one embodiment, the exchange rate 127 may be provided in real-time in response to a request. In another embodiment, an average of multiple exchange rates 127 may be used. As a non-limiting example, a moving average for the exchange rate 127 may be used, where the moving average is defined relative to a time period (e.g., an hour, a day, etc.).

As a non-limiting example, a merchant in the United States may set a desired return of ten dollars for an item to be sold in an electronic marketplace 130 that is directed towards customers in France. This desired return may convert to five euros initially. A transaction cost of two euros may be added, for a final price of seven euros. However, after a time period, the exchange rate 127 between euros and dollars may have changed such that five euros may yield only five dollars. Accordingly, the portion of the price attributable to the return should be increased to ten euros, for a final price of twelve euros. Depending on the configuration of the pricing monitor service 121, the pricing monitor service 121 may automatically adjust the price of the item to twelve euros, suggest a price of twelve euros to the merchant, temporarily disable the listing of the item, and/or implement another action.

It is noted that the merchant may specify numerous parameters other than merely a desired return. A minimum return, maximum return, maximum currency exchange rate fluctuation, maximum price, minimum price, and/or other parameters and thresholds may be specified. The pricing monitor service 121 may be configured to examine pricing on a specified periodic basis. Furthermore, the pricing monitor service 121 may be configured to detect when an item is irregularly priced compared to other items offered in the electronic marketplace 130. For example, due to currency fluctuations, an item may be priced too low or too high in comparison to other items offered in the electronic marketplace 130. Consequently, the pricing may be adjusted, the merchant may be notified, and/or other actions may be implemented to correct the irregular pricing.

In addition to monitoring and adjusting pricing of items, the pricing monitor service 121 may be configured to monitor and adjust shipping and handling charges for items. For example, a merchant may initially establish a shipping and handling charge of ten pounds in the United Kingdom, which may convert to twenty dollars in the United States. After currency fluctuations, twenty dollars may be only worth nine pounds. Accordingly, the pricing monitor service 121 may be configured to adjust the shipping and handling charge to $22.22. Alternatively, the pricing monitor service 121 may be configured to suggest a change to the shipping or handling charge, temporarily disable ordering, or implement some other action.

Figure 2:
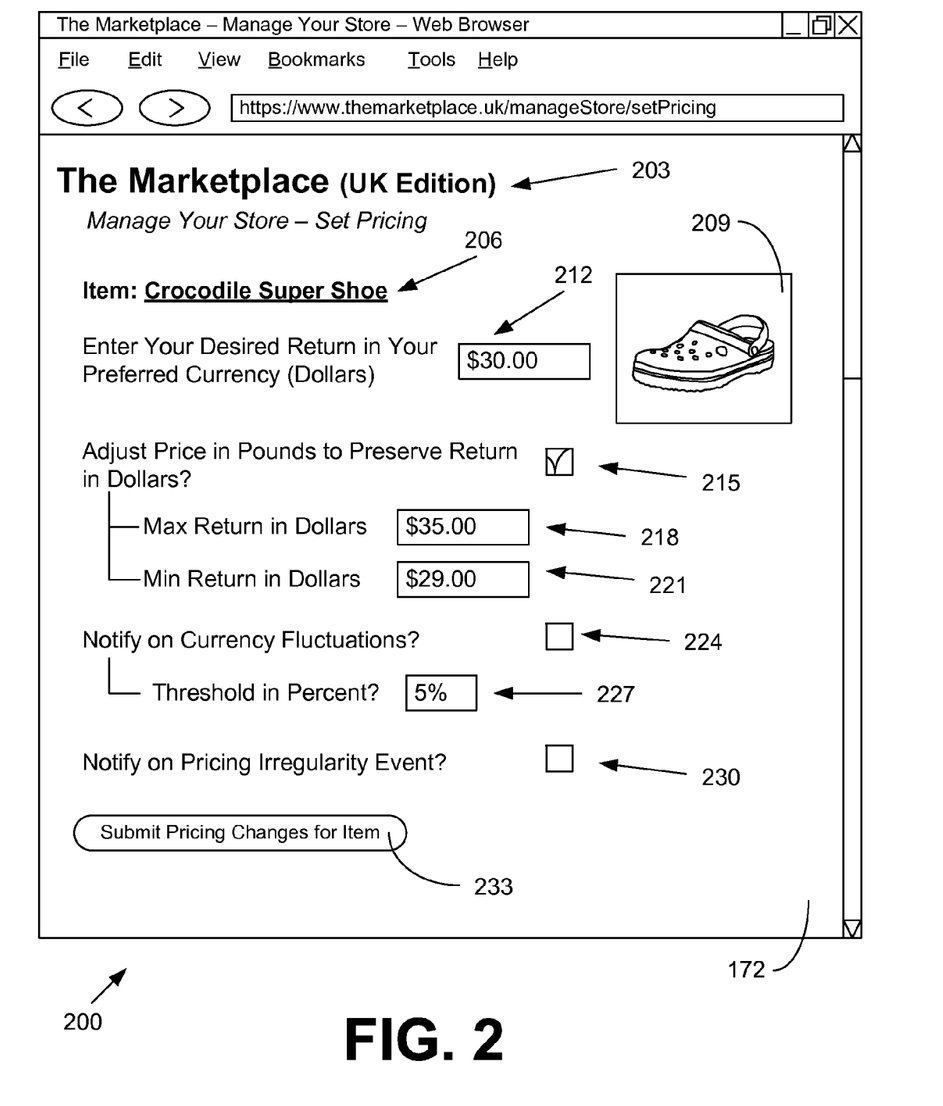
FIG. 2 is a drawing of an example of a user interface rendered by a client in the networked environment of FIG. 1 according to various embodiments of the present disclosure.

Continuing on to FIG. 2, shown is an example of a user interface 200 rendered in the browser 169 (FIG. 1) executed in the client 106 (FIG. 1) in the networked environment 100 (FIG. 1) according to various embodiments. Specifically, the user interface 200 depicts a rendered network page 172 that corresponds to an administrative page for a merchant that has been generated by the merchant management application 118

(FIG. 1). The rendered network page 172 facilitates pricing configuration for a particular item offered by the merchant in an electronic marketplace 130 (FIG. 1). In this non-limiting example, the title 203 indicates that the item is being configured for a marketplace that targets the United Kingdom. An item description 206 and item image 209 indicate that the item for which pricing is being configured is the "Crocodile Super Shoe."

A desired return component 212 enables a merchant user to input a desired return for the item in dollars, which corresponds to the local currency of the merchant. In various embodiments, the desired return may be inclusive or exclusive of transaction costs and/or other fees. The desired return is used to set an initial price for the item in the electronic marketplace 130. A price adjustment configuration component 215 allows the merchant to enable automatic price adjustments by the pricing monitor service 121 (FIG. 1) to maintain the return after fluctuations in the exchange rate 127 (FIG. 1) between the local currency and the foreign currency.

The merchant may be able to specify a maximum return with a maximum return component 218 and a minimum return with a minimum return component 221. In other examples, the merchant may be able to configure hysteresis parameters to avoid frequent re-pricing. In other examples, the merchant may specify a maximum price and/or a minimum price in the foreign currency. As alternatives to re-pricing, the merchant may be able to configure notification or temporary removal of the listing.

A fluctuation notification component 224 may be provided in order to enable notifications to the merchant when the exchange rate 127 fluctuates beyond a threshold, which may be specified through a threshold specification component 227. An irregular pricing notification component 230 may be provided in order to enable notifications to the merchant when the pricing of the item is deemed irregular in comparison to other offerings of the item in the electronic marketplace 130. A submit component 233 may be included in order to send the changes to the pricing parameters to the merchant management application 118, which in turn may commit the changes to the marketplace pricing configuration 160 (FIG. 1).

It is understood that the example user interface 200 is not intended to be limiting. In other embodiments, different parameters may be obtained from the merchant. Additionally, in other embodiments, different user interface components from those in FIG. 2 may be used (e.g., checkboxes, sliders, text fields, text areas, links, buttons, radio buttons, etc.). Although the example of FIG. 2 refers to a single item, other interfaces may be provided to enable configuration of pricing for multiple items.

Figure 3:
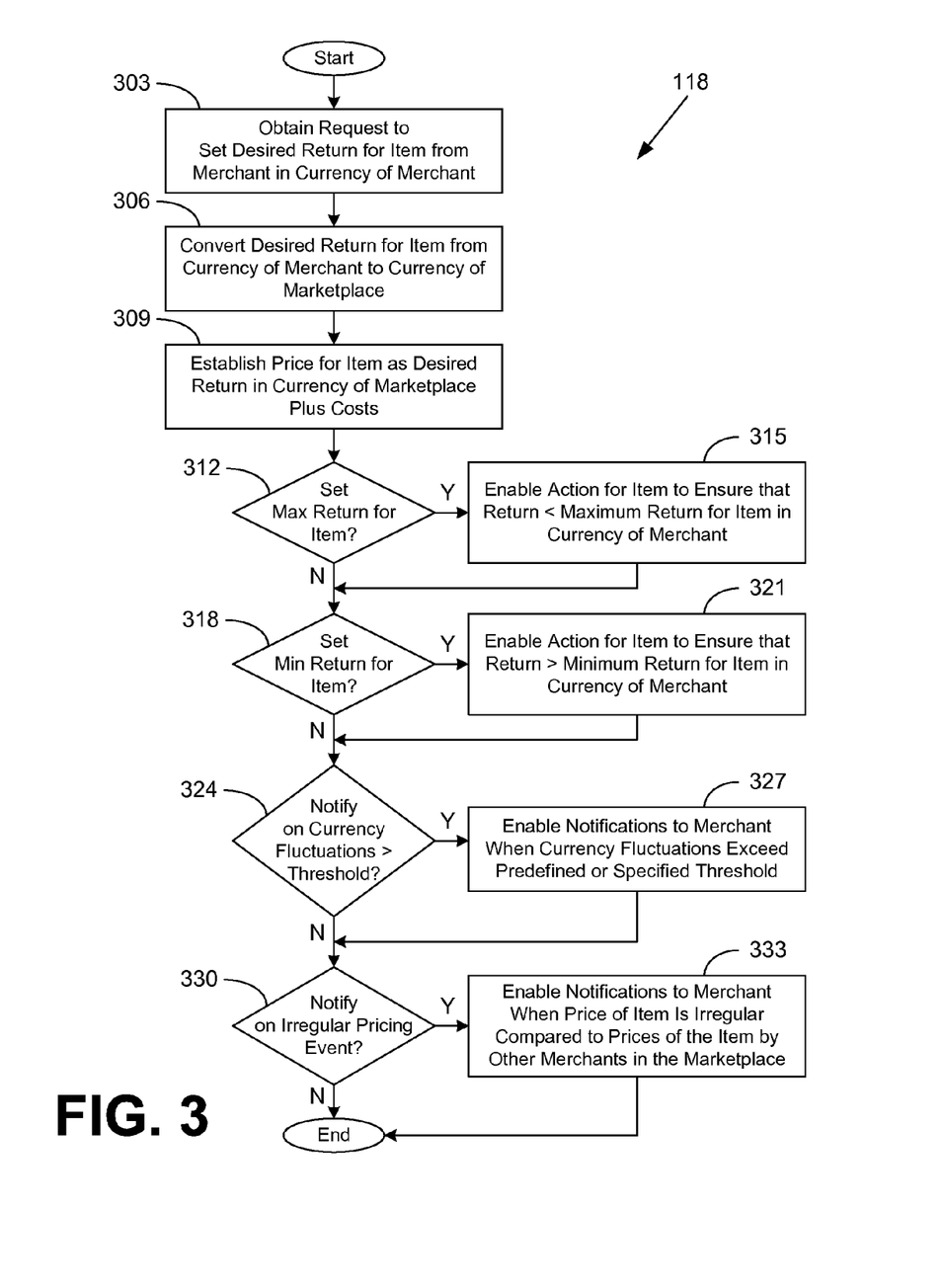
FIG. 3 is a flowchart illustrating one example of functionality implemented as portions of merchant management application executed in a computing device in the networked environment of FIG. 1 according to various embodiments of the present disclosure.

Referring next to FIG. 3, shown is a flowchart that provides one example of the operation of a portion of the merchant management application 118 according to various embodiments. It is understood that the flowchart of FIG. 3 provides merely an example of the many different types of functional arrangements that may be employed to implement the operation of the portion of the merchant management application 118 as described herein. As an alternative, the flowchart of FIG. 3 may be viewed as depicting an example of steps of a method implemented in the computing device 103 (FIG. 1) according to one or more embodiments.

Beginning with box 303, the merchant management application 118 obtains a request to set a desired return for an item from a merchant at a client 106 (FIG. 1). The desired return for the item is specified in a local currency of the merchant. In box 306, the merchant management application 118 converts the desired return of the merchant from the local currency of the merchant to the foreign currency employed in the foreign electronic marketplace 130 (FIG. 1) in which the merchant is offering the item. To this end, the merchant management application 118 may obtain a current exchange rate 127 (FIG. 1) from the exchange rate data provider 163 (FIG. 1) to convert between the local currency of the merchant and the foreign currency.

In box 309, the merchant management application 118 establishes a price for the item in the electronic marketplace 130 for the merchant as the desired return converted to the foreign currency plus any transaction costs such as fixed fees, commissions, and so on. In box 312, the merchant management application 118 determines whether the merchant has set a maximum return for the item. If the merchant has set a maximum return for the item, the merchant management application 118 proceeds to box 315 and enables one or more actions for the item to ensure that the return for the item does not exceed the maximum return for the item in the currency of the merchant. For example, based upon configuration of the merchant in the marketplace pricing configuration 160 (FIG. 1), the merchant management application 118 may enable notifications, automatic re-pricing, temporary removal of the item from the electronic marketplace 130, and/or other actions to ensure that the return for the item does not exceed the maximum return for the item.

Thereafter, the merchant management application 118 proceeds to box 318. If the merchant has not set a maximum return for the item, the merchant management application 118 also proceeds to box 318. In box 318, the merchant management application 118 determines whether the merchant has set a minimum return for the item. If the merchant has set a minimum return for the item, the merchant management application 118 proceeds to box 321 and enables one or more actions for the item to ensure that the return for the item does not fall beneath the minimum return for the item in the currency of the merchant. For example, based upon configuration of the merchant in the marketplace pricing configuration 160, the merchant management application 118 may enable notifications, automatic re-pricing, temporary removal of the item from the electronic marketplace 130, and/or other actions to ensure that the return for the item does not fall beneath the minimum return for the item.

Thereafter, the merchant management application 118 continues to box 324. If the merchant has not set a minimum return for the item, the merchant management application 118 also continues to box 324. In box 324, the merchant management application 118 determines whether the merchant has requested to be notified when a fluctuation in the exchange rate 127 between the local currency and the foreign currency meets or exceeds a threshold. For example, a merchant may request to be notified when the exchange rate 127 changes by at least five percent. If the merchant has requested to be notified, the merchant management application 118 moves to box 327 and enables notifications to be sent to the merchant when the currency fluctuation exceeds a predefined threshold or a user-specified threshold.

Next, the merchant management application 118 moves to box 330. If the merchant has not requested to be notified on currency fluctuations, the merchant management application 118 also moves to box 330. In box 330, the merchant management application 118 determines whether the merchant has requested to be notified on the occurrence of an irregular pricing event. For example, an irregular pricing event may be generated when the price established by the merchant is relatively low or is relatively high when compared to prices for the item offered by other merchants in the electronic marketplace 130.

If the merchant has requested to be notified, the merchant management application 118 continues to box 333 and enables notifications to the merchant when the price of the item is irregular compared to prices of the item offered by other merchants in the electronic marketplace 130. Such notifications may be configured to be sent on specific irregular pricing events (e.g., notify when the price is irregularly low but not irregularly high). Thereafter, the portion of the merchant management application 118 ends. If the merchant has not requested to be notified, the portion of the merchant management application 118 also ends.

Figure 4:
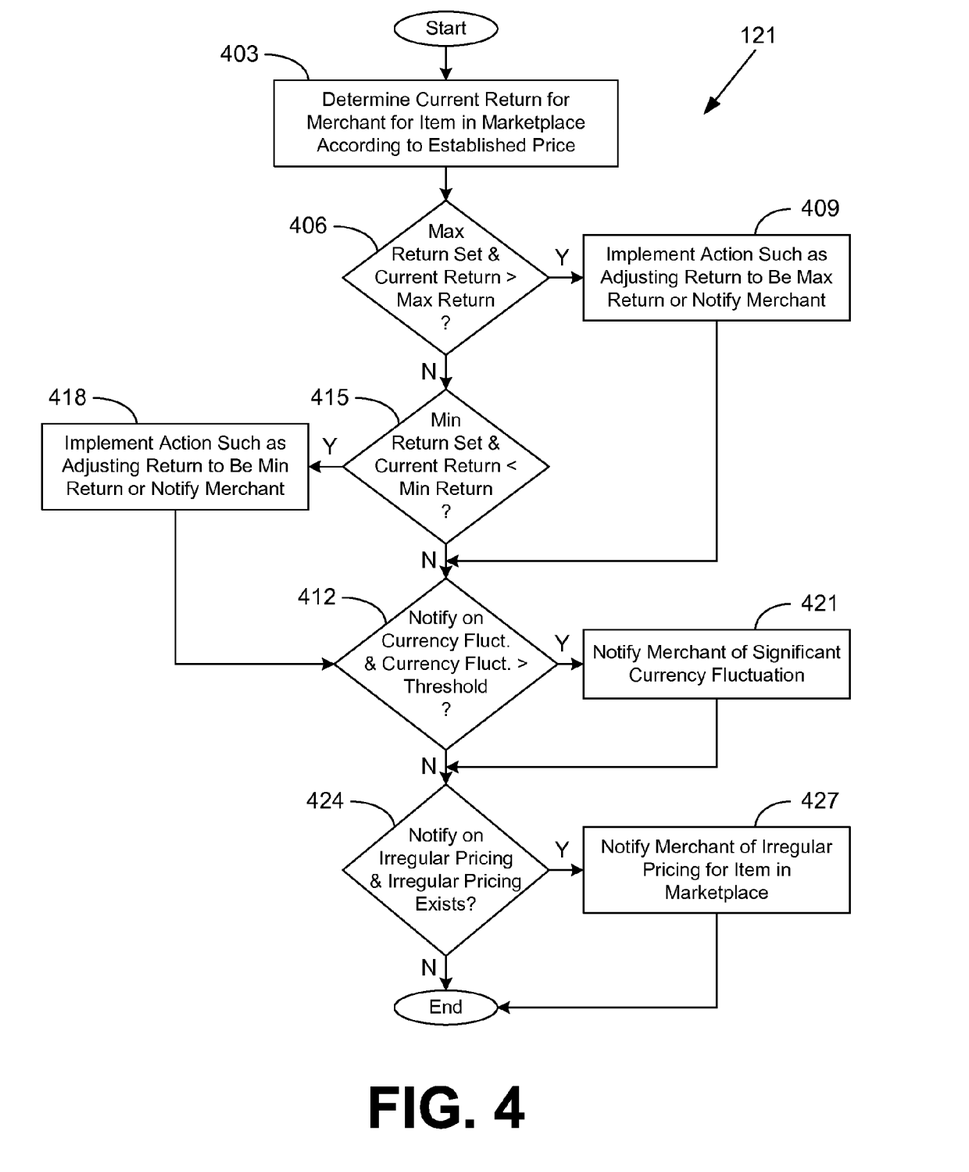
FIG. 4 is a flowchart illustrating one example of functionality implemented as portions of pricing monitor service executed in a computing device in the networked environment of FIG. 1 according to various embodiments of the present disclosure.

Turning now to FIG. 4, shown is a flowchart that provides one example of the operation of a portion of the pricing monitor service 121 according to various embodiments. It is understood that the flowchart of FIG. 4 provides merely an example of the many different types of functional arrangements that may be employed to implement the operation of the portion of the pricing monitor service 121 as described herein. As an alternative, the flowchart of FIG. 4 may be viewed as depicting an example of steps of a method implemented in the computing device 103 (FIG. 1) according to one or more embodiments.

Beginning with box 403, the pricing monitor service 121 determines the current return for the merchant for the item in a foreign electronic marketplace 130 (FIG. 1) according to the price that has been established. To this end, the pricing monitor service 121 may obtain an updated exchange rate 127 (FIG. 1) from the exchange rate data provider 163 (FIG. 1) in order to convert from the currency of the established price to the local currency of the return to the merchant. In box 406, the pricing monitor service 121 determines whether a maximum return has been set and, if so, whether the current return exceeds the maximum return.

If the current return exceeds the maximum return, the pricing monitor service 121 continues to box 409 and implements an action to correct the pricing such as adjusting the return to be the maximum return, notifying the merchant, temporarily disabling the listing, and/or another action. Thereafter, the pricing monitor service 121 proceeds to box 412. If the current return does not exceed the maximum return, or if a maximum return is not set, the pricing monitor service 121 proceeds to box 415.

In box 415, the pricing monitor service 121 determines whether a minimum return has been set and, if so, whether the current return is below the minimum return. If the current return is below the minimum return, the pricing monitor service 121 continues to box 418 and implements an action to correct the pricing such as adjusting the return to be the minimum return, notifying the merchant, temporarily disabling the listing, and/or another action. Thereafter, the pricing monitor service 121 proceeds to box 412. If the current return is not below the minimum return, or if a minimum return is not set, the pricing monitor service 121 also proceeds to box 412.

In box 412, the pricing monitor service 121 determines whether the merchant wishes to be notified upon a currency/exchange rate fluctuation and, if so, whether the currency fluctuation exceeds or meets a threshold. As a non-limiting example, the exchange rate between a local currency of the merchant and the foreign currency of the electronic marketplace 130 may have changed or fluctuated beyond five percent since the merchant last established an item price. If the currency fluctuation exceeds or meets the threshold, the pricing monitor service 121 continues to box 421 and notifies the merchant of the significant currency fluctuation and/or performs another action. Thereafter, the pricing monitor service 121 proceeds to box 424. If the currency fluctuation does not meet the threshold, or if such notifications are not enabled, the pricing monitor service 121 also proceeds to box 424.

In box 424, the pricing monitor service 121 determines whether the merchant wishes to be notified upon an irregular pricing event and, if so, whether irregular pricing exists. As a non-limiting example, the pricing of the item by a merchant may be deemed irregular if it deviates from an average price or a prevailing price in the electronic marketplace 130 by a threshold. Thus, the pricing of the item may be compared with pricing of the same or similar item offered by other merchants in the electronic marketplace 130. If the irregular pricing exists, the pricing monitor service 121 continues to box 427 and notifies the merchant of the irregular pricing and/or performs another action. Thereafter, the portion of the pricing monitor service 121 ends. If the pricing is not deemed irregular, or if such notifications are not enabled, the portion of the pricing monitor service 121 also ends.

Figure 5:
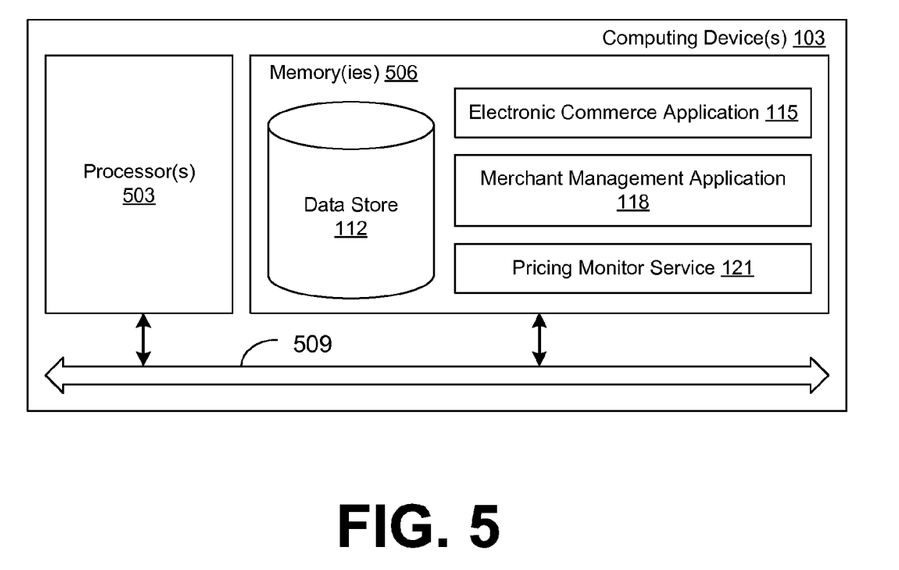
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce application 115, the merchant management application 118, the pricing monitor service 121, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components.

Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application 115, the merchant management application 118, the pricing monitor service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the merchant management application 118 and the pricing monitor service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 115, the merchant management application 118, and the pricing monitor service 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    a pricing monitor service being executed in the at least one computing device, the pricing monitor service comprising:
        logic that determines a deviation from a return sought by a merchant for an item offered in an electronic marketplace, the deviation resulting from a change in an exchange rate between a first currency employed by the merchant and a second currency employed by the electronic marketplace;
        logic that determines whether the deviation from the return meets a threshold; and
        logic that implements at least one action in response to the deviation when the deviation from the return meets the threshold.

2. The system of claim 1, wherein the logic that determines whether the deviation from the return meets the threshold is configured to compare a current return for the item for the merchant with a minimum return for the item for the merchant established by the merchant.

3. The system of claim 1, wherein the logic that determines whether the deviation from the return meets the threshold is configured to compare a current return for the item for the merchant with a maximum return for the item for the merchant established by the merchant.

4. The system of claim 1, wherein the logic that determines whether the deviation from the return meets the threshold is configured to compare the change in the exchange rate with the threshold.

5. The system of claim 1, wherein the at least one action includes notifying the merchant of the deviation.

6. The system of claim 1, wherein the at least one action includes removing an offering of the item by the merchant from the electronic marketplace.

7. The system of claim 1, wherein the at least one action is directed at correcting the deviation.

8. The system of claim 7, wherein the at least one action includes automatically adjusting a price of the item in the second currency in the electronic marketplace to correct the deviation.

9. The system of claim 1, wherein the electronic marketplace offers a plurality of items for sale by a plurality of merchants, and the electronic marketplace is targeted toward a country that uses the second currency.

10. The system of claim 1, wherein the return sought by the merchant for the item is specified by the merchant in the first currency.

11. The system of claim 1, wherein the return sought by the merchant excludes a transaction cost included in a final price of the item by a proprietor of the electronic marketplace.

12. The system of claim 1, wherein the logic that determines the deviation is further configured to obtain a current exchange rate between the first currency and the second currency.

13. The system of claim 12, wherein the logic that determines the deviation is further configured to calculate the deviation by comparing a current return for the merchant for the item according to the current exchange rate with a previous return for the merchant for the item according to a previous exchange rate between the first currency and the second currency.

14. The system of claim 13, wherein the previous return was specified by the merchant when the previous exchange rate was in effect.

15. The system of claim 13, wherein the current exchange rate comprises an average of a plurality of exchange rates between the first currency and the second currency.

16. The system of claim 13, wherein the current exchange rate comprises a moving average for the exchange rate relative to a time period.

17. A method, comprising:
determining, by at least one computing device, a deviation from a return sought by a merchant for an item offered in an electronic marketplace, the deviation resulting from a change in an exchange rate between a first currency employed by the merchant and a second currency employed by the electronic marketplace;
determining, by the at least one computing device, whether the deviation from the return meets a threshold; and
implementing, by the at least one computing device, at least one action in response to the deviation when the deviation from the return meets the threshold.

18. The method of claim 17, further comprising:
receiving, by the at least one computing device, a desired shipping charge for the item from the merchant, the desired shipping charge being specified in the first currency; and
establishing, by the at least one computing device, a shipping charge for the item in the electronic marketplace in the second currency based at least in part on the desired shipping charge for the item and the exchange rate.

19. The method of claim 17, further comprising:
determining, by the at least one computing device, that a price of the item deviates from at least one other price of the item offered by at least one other merchant in the electronic marketplace by at least another threshold; and
notifying, by the at least one computing device, the merchant of a pricing irregularity associated with the item.

20. The method of claim 17, wherein determining whether the deviation from the return meets the threshold further comprises at least one of:
comparing, by the at least one computing device, a current return for the item for the merchant with a minimum return for the item for the merchant established by the merchant;
comparing, by the at least one computing device, a current return for the item for the merchant with a maximum return for the item for the merchant established by the merchant; or
comparing, by the at least one computing device, the change in the exchange rate with the threshold.

21. The method of claim 17, wherein the at least one action includes at least one of:
notifying, by the at least one computing device, the merchant of the deviation;
removing, by the at least one computing device, an offering of the item by the merchant from the electronic marketplace; or
automatically adjusting, by the at least one computing device, a price of the item in the second currency in the electronic marketplace to correct the deviation.

22. A non-transitory computer-readable medium embodying at least one program being executing in at least one computing device, comprising:
code that determines a deviation from a return sought by a merchant for an item offered in an electronic marketplace, the deviation resulting from a change in an exchange rate between a first currency employed by the merchant and a second currency employed by the electronic marketplace;
code that determines whether the deviation from the return meets a threshold; and
code that implements at least one action in response to the deviation when the deviation from the return meets the threshold.

23. The non-transitory computer-readable medium of claim 22, wherein the code that determines whether the deviation from the return meets the threshold is configured to:
compare a current return for the item for the merchant with a minimum return for the item for the merchant established by the merchant;
compare a current return for the item for the merchant with a maximum return for the item for the merchant established by the merchant; or
compare the change in the exchange rate with the threshold.

24. The non-transitory computer-readable medium of claim 22, wherein the at least one action includes at least one of:

notifying the merchant of the deviation;
removing an offering of the item by the merchant from the electronic marketplace; or
automatically adjusting a price of the item in the second currency in the electronic marketplace to correct the deviation.

\* \* \* \* \*